US010943212B2

(12) United States Patent
Ranade

(10) Patent No.: US 10,943,212 B2
(45) Date of Patent: Mar. 9, 2021

(54) METHOD AND SYSTEM FOR IDENTIFYING, TRACKING, AND COMPENSATING INDIVIDUALS IN JOB REFERRAL CHAIN

(71) Applicant: Vinayak Ranade, Somerville, MA (US)

(72) Inventor: Vinayak Ranade, Somerville, MA (US)

( * ) Notice: Subject to any disclaimer, the term of this patent is extended or adjusted under 35 U.S.C. 154(b) by 833 days.

(21) Appl. No.: 14/707,819

(22) Filed: May 8, 2015

(65) Prior Publication Data

US 2015/0324748 A1 Nov. 12, 2015

Related U.S. Application Data

(60) Provisional application No. 61/990,817, filed on May 9, 2014.

(51) Int. Cl.
*G06Q 10/10* (2012.01)
*G06Q 30/02* (2012.01)
*G06Q 50/00* (2012.01)

(52) U.S. Cl.
CPC ....... *G06Q 10/105* (2013.01); *G06Q 10/1053* (2013.01); *G06Q 30/0241* (2013.01); *G06Q 50/01* (2013.01)

(58) Field of Classification Search
USPC ....................................................... 705/321
See application file for complete search history.

(56) References Cited

U.S. PATENT DOCUMENTS

| 7,774,229 | B1 * | 8/2010 | Dernehl | G06Q 30/0253 705/14.16 |
| 9,454,577 | B1 * | 9/2016 | Kapoor | G06F 17/30569 |
| 2005/0080657 | A1 * | 4/2005 | Crow | G06Q 10/063112 705/7.14 |
| 2006/0212476 | A1 * | 9/2006 | Bogle | G06Q 10/06 |
| 2006/0224729 | A1 * | 10/2006 | Rowe | G06Q 10/06 709/224 |
| 2007/0033064 | A1 * | 2/2007 | Abrahamsohn | G06Q 10/06 705/321 |
| 2012/0330701 | A1 * | 12/2012 | Hyder | G06Q 30/0214 705/7.11 |

FOREIGN PATENT DOCUMENTS

WO   WO-2013078399 A1 *   5/2013   ........... G06Q 10/105

OTHER PUBLICATIONS

Yakubovich, V., & Lup, D., Stages of Recruitment Process and the Referrer's Performance Effect, Nov. 2006, Organization Science, 17 (6), 710-723 (Year: 2006).*

* cited by examiner

*Primary Examiner* — Michael Young
(74) *Attorney, Agent, or Firm* — DLA Piper LLP (US)

(57) ABSTRACT

A method and system are provided to combine best practices with a new discovery method, incentive structure and tracking system for better results in the referral process, particularly in the domain of employment. Crowdsourcing using a tiered peer-to-peer referral incentive system that encourages higher quality inbound leads combined with data analytics and machine learning techniques of identifying high quality referrers and candidates improve success rates, and leveraging online and offline Social and Professional networks creates a frictionless user experience. Tracking technologies and methods inspired by the online advertising industry across a variety of platforms (desktop/handheld/wearable devices) enable improved crowdsourcing and reward strategies.

20 Claims, 13 Drawing Sheets

601 — Job Information eg: location, title, position, requirements, company profile, historical referral data.

+

602 — User data eg: location, work history, current job, industry, social and professional networks, job referral history and success rate 603 — Referrer Match Score for a job

Fig 6

701 — Seeded Job 1 + Outcome (Number of people referred successfully, number of people referred unsuccessfully, did not refer, referral depth per person referred, referral time-to-hire)

+

702 — Seeded Job 2 + Outcome (Number of people referred successfully, number of people referred unsuccessfully, did not refer, referral depth per person referred, referral time-to-hire)

+ . .

703 — Seeded Job N + Outcome (Number of people referred successfully, number of people referred unsuccessfully, did not refer, referral depth per person referred, referral time-to-hire)

704 — Referrer Quality Score

Fig 7

| JobID | CompayID | FromID | ToID | TrackingID | Method | Status |
|---|---|---|---|---|---|---|
| 110 | 5 | 1 | 2 | HULFD8 | Email | Referred |
| 110 | 5 | 2 | 3 | HULFD8 | SMS | Referred |
| 110 | 5 | 3 | 4 | HULFD8 | App | Applied |
| 111 | 6 | 10 | 11 | BAVG4H | Facebook | Referred |
| 111 | 6 | 11 | 12 | BAVG4H | LinkedIn | Pending |

1100 Tracking Database

Fig 11

| 1201 | 1202 | 1203 | 1204 | 1205 | 1206 | 1207 |
|---|---|---|---|---|---|---|
| JobID | CompanyID | Location | Salary | Equity/Bonus/etc | Type | Value |
| 110 | 5 | Boston | $80,000 | 100 RSU | System Analyst | 16,000 |
| 111 | 6 | London | $90,000 | 20% | Software Engineer | 18,000 |

| 1211 | 1212 | 1213 | 1214 |
|---|---|---|---|
| Name | CompanyID | Location | Contact |
| Google | 5 | Mountain View, CA | jobs@google.com |
| Apple | 6 | Cupertino, CA | jobs@apple.com |

| User ID 1301 | Username 1302 | Token 1303 | Type 1304 | Tracking ID 1305 | Location 1306 | Source 1307 | Quality Score 1308 |
|---|---|---|---|---|---|---|---|
| 1 | foo@bar.com | encrypted | Facebook | UABEV1 | Boston | Self | 1 |
| 2 | john@john.com | encrypted | LinkedIn | TE3ORU | Mountain View | Friend:UABEV1 | 5 |
| 3 | sam@sam.com | encrypted | Google+ | WE8R34 | Cupertino | GoogleAds | 10 |

METHOD AND SYSTEM FOR IDENTIFYING, TRACKING, AND COMPENSATING INDIVIDUALS IN JOB REFERRAL CHAIN

CROSS-REFERENCE TO RELATED APPLICATIONS

This application claims the benefit of U.S. Provisional Pat. App. Ser. No. 61/990,817, filed on May 9, 2014, which is hereby incorporated by reference herein in its entirety.

BACKGROUND

In today's job marketplace, there are several popular ways to discover and recruit new employees—online job postings, career events, recruiting agencies, and employee referrals. There are many incentive structures used for generating inbound leads on candidates, and several processes to interview, hire and close candidates.

SUMMARY

The present disclosure relates to a method to combine best practices from all these domains with a new discovery method, incentive structure and tracking system for better results. This includes:
  Crowdsourcing using a tiered peer-to-peer referral incentive system that encourages higher quality inbound leads
  Methods based on data analytics and machine learning techniques of identifying high quality referrers and candidates
  Leveraging online and offline Social and Professional networks to create a frictionless user experience
  Tracking technologies and methods inspired by the online advertising industry across a variety of platforms (desktop/handheld/wearable devices)

BRIEF DESCRIPTION OF FIGURES

FIG. 6 illustrates one way to compute a metric called a Match Score that serves as an indicator of how well a particular job opening relates to a particular user in the application network, according to an embodiment of the present disclosure.

FIG. 7 illustrates one way to compute a metric called the Quality Score, according to embodiments of the present disclosure.

FIG. 11 depicts a tracking database table, according to some embodiments of the present disclosure.

FIG. 12A illustrates a Job table, according to some embodiments of the present disclosure.

FIG. 12B illustrates a Company table, according to some embodiments of the present disclosure.

FIG. 13 illustrates a User information table, according to some embodiments of the present disclosure.

DETAILED DESCRIPTION

Figure 1:
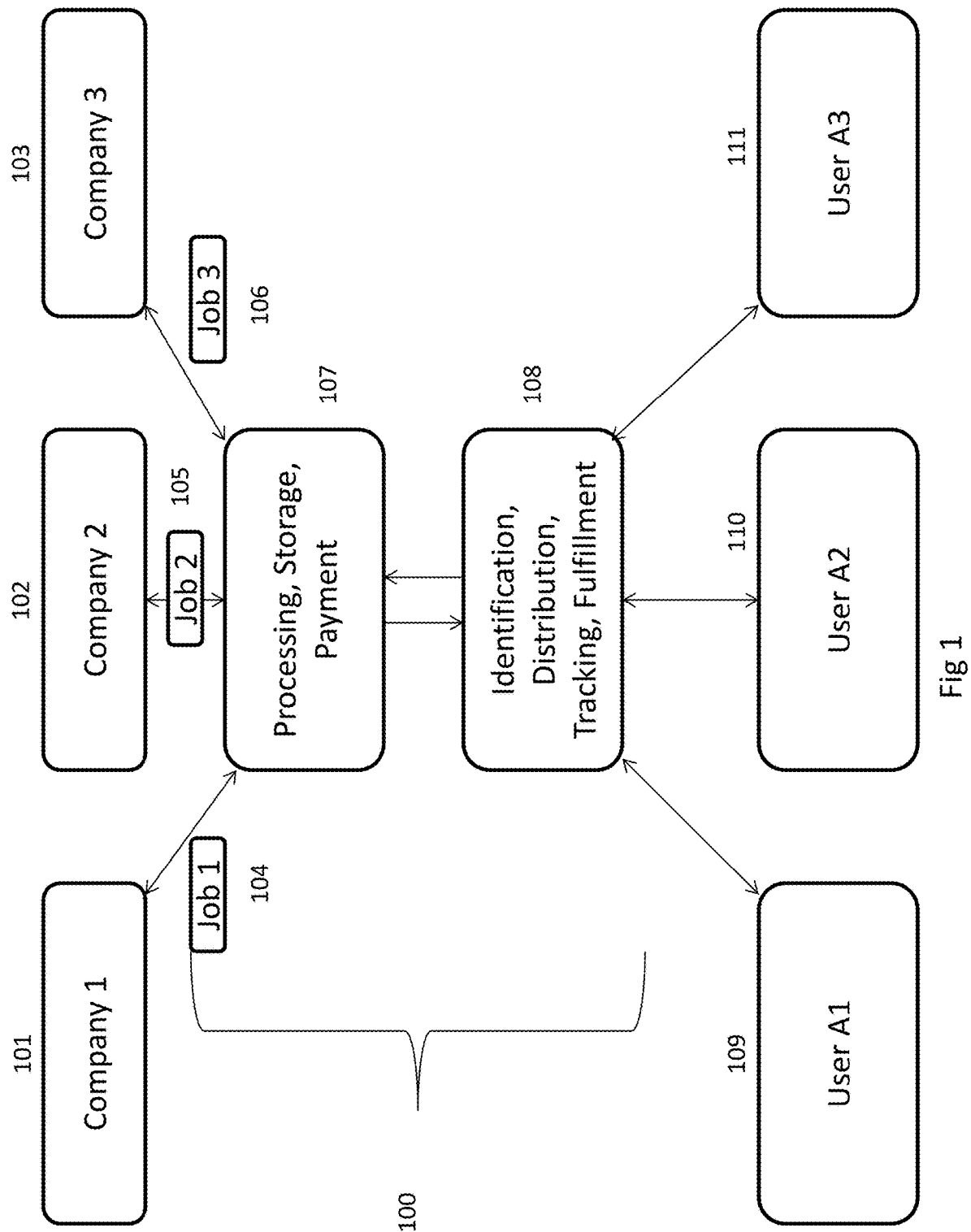
FIG. 1 is an overview system diagram showing our referral and hiring system 100, according to some embodiments of the present disclosure.

The system according to embodiments of the present disclosure can have two interfaces: one with the customers (the hiring companies) and one with the users (mass market). The overall workflow is as follows:
  Company sends job description with details of the job like position, location, salary, benefits, and company background to the system, either through an online interface or through an account manager. A bounty is placed on the filling of the job opening either by the company or through a dynamic real-time value estimator provided by the system. This bounty may be in the form of a virtual currency that can be earned and redeemed in a variety of ways similar to loyalty program points, or money.
  The system chooses or identifies a seed population of users based on factors like location, position, company industry etc. and notifies them of the new job posting through avenues such as the user facing software via email, SMS, or other known messaging methods.
  User A is able to either apply for the job directly or pass it on to someone else via any means that is trackable; e.g., email, SMS, through the user facing app, or with an offline tracking code. There can be a limit to the number and frequency of referrals User A may make.
  Some user in one of the chains of referral applies for the job. The application may consist of sending a resume/profile/candidate information, tapping an "apply" button in the app, or simply emailing a designated inbound lead address at the hiring company (e.g., jobs@company.com).
  If they are hired, everyone in that chain can get rewards from the pool of incentive bounty provided by the hiring company. This distribution is calculated based on factors such as the number of links in the chain, the total amount of the bounty, some measure of user quality, user loyalty and past referral quality.
  The distribution of reward funds is done either through the system or directly by the hiring company, and successfully hired candidates can be reported either by the hiring company or by users in the referral chain (including the applicant) aware of the hiring success.

For example, let's say Company Foo would like to reward $20,000 for the successful hire of a Software Engineer. The system identifies John Doe as the first user in the seed population. John gets notified of the job on his smartphone and decides to pass it on to Jane via SMS. Jane downloads the system app and decides to pass it on via Facebook to Janet. Janet applies for and gets the job at Company Foo.

Company Foo reports this to the system and removes its job posting and reward. The system decides to reward Janet $10,000, Jane $7,000, and John $3,000 based on where they were in the chain. Janet, Jane, and John get paid through the system or by Company Foo directly. The system can provide several payment breakdown options based on the company's preferences. Some companies will opt to give a signing bonus to Janet directly in which case the system will split the reward between Jane and John, perhaps as $14,000 and $6,000 respectively.

FIG. 1 is an overview system diagram showing such a referral and hiring system 100, according to some embodiments of the present disclosure. The processing and storage module 107 can be a system for organizing different jobs 104,105,106, accounts, and payment and billing solutions related to the companies 101,102,103 that are customers of the system. FIGS. 12 and 13, below, provide more detail about how the data for user accounts, jobs, and companies may be organized. This module can include a third party payment solution using credit cards such as PayPal or Stripe, or an ACH based transaction solution like Square Cash or Balanced to facilitate automated or manual payments from companies to the system.

Figure 3:
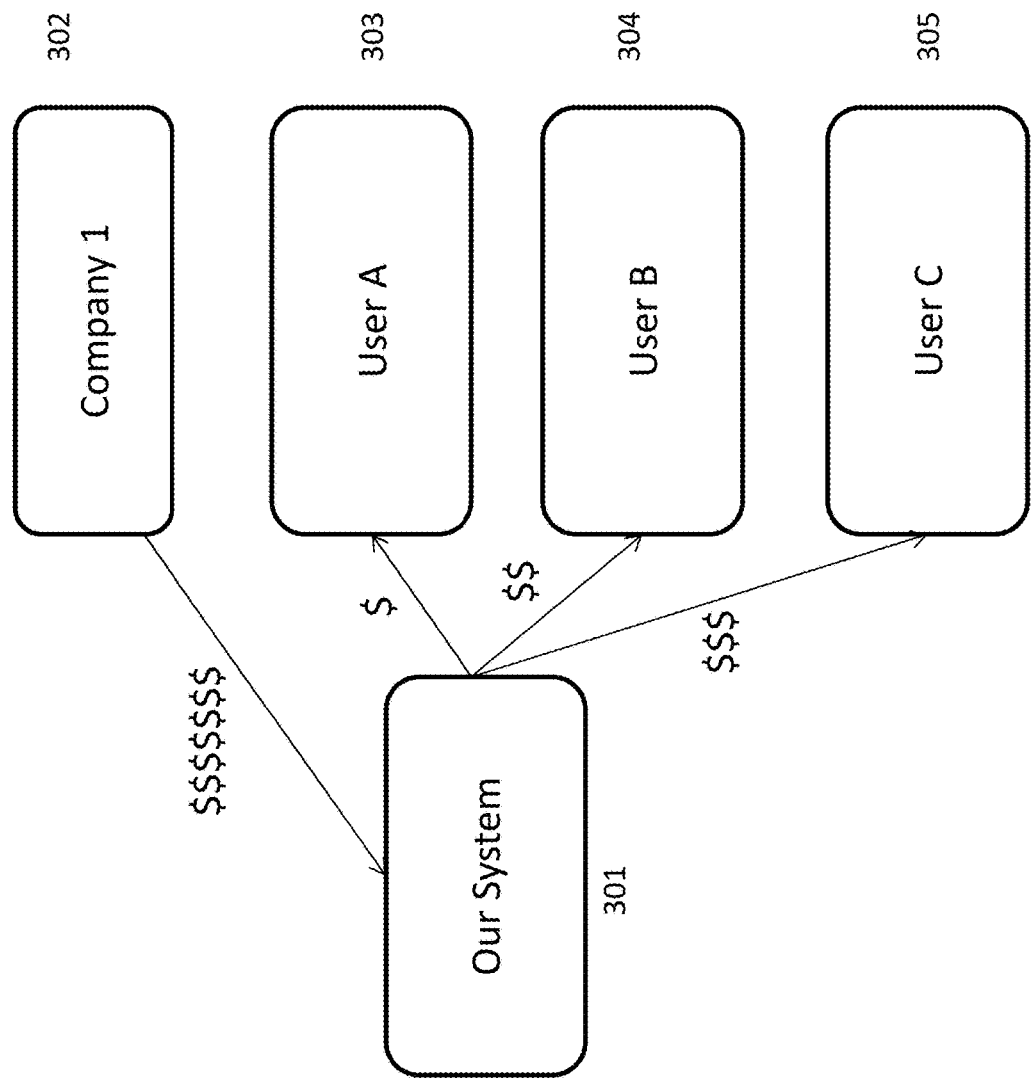
FIG. 3 is an illustration of the process used to disburse rewards, according to some embodiments of the present disclosure.
Figure 5:
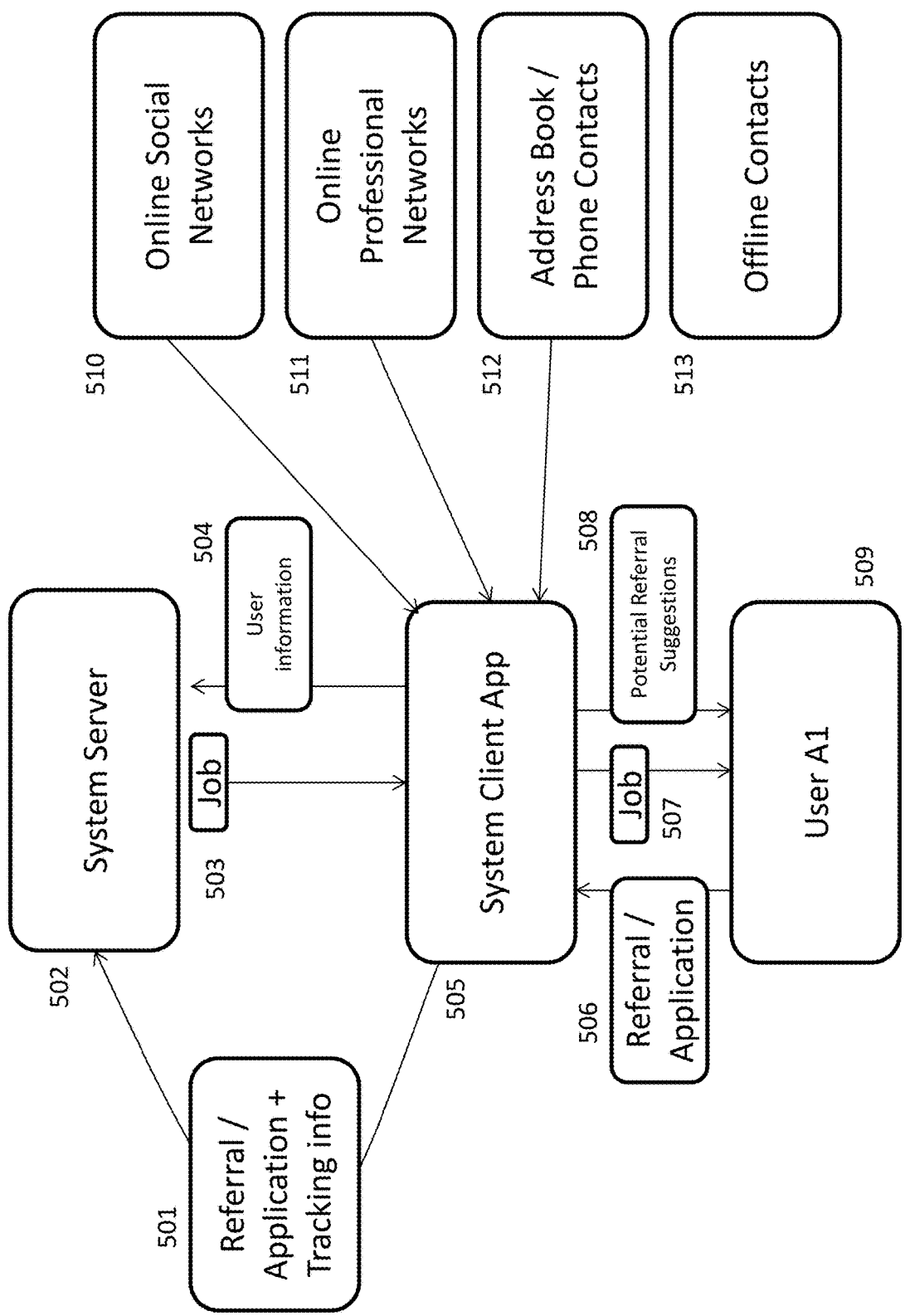
FIG. 5 is an overview of the user-facing client application, according to some embodiments of the present disclosure.
Figure 9:
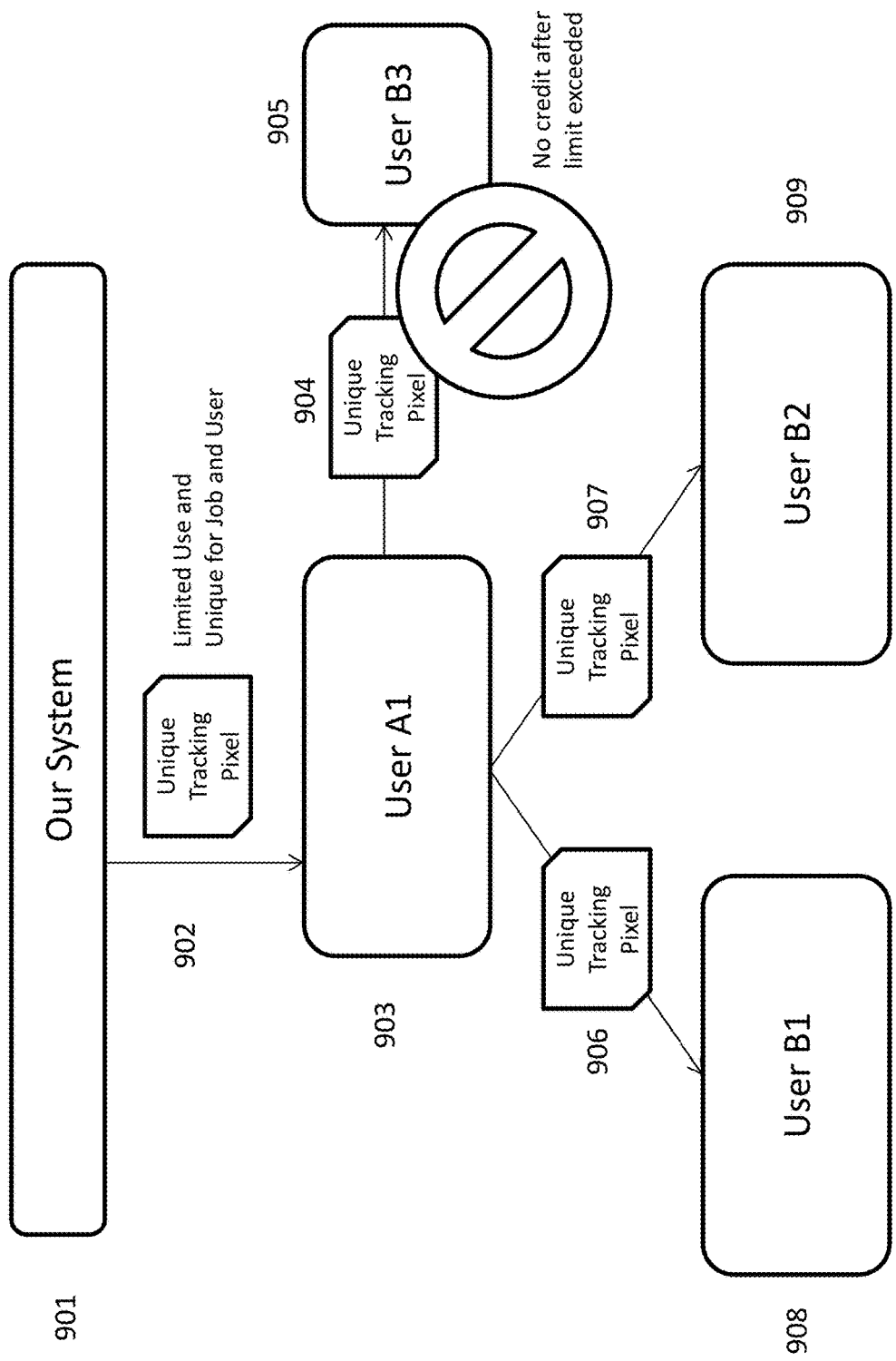
FIG. 9 illustrates the tracking of referrals for the job as well as the enforcement of referral criteria such as the referral limit per user per job, according to embodiments of the present disclosure.
Figure 10:
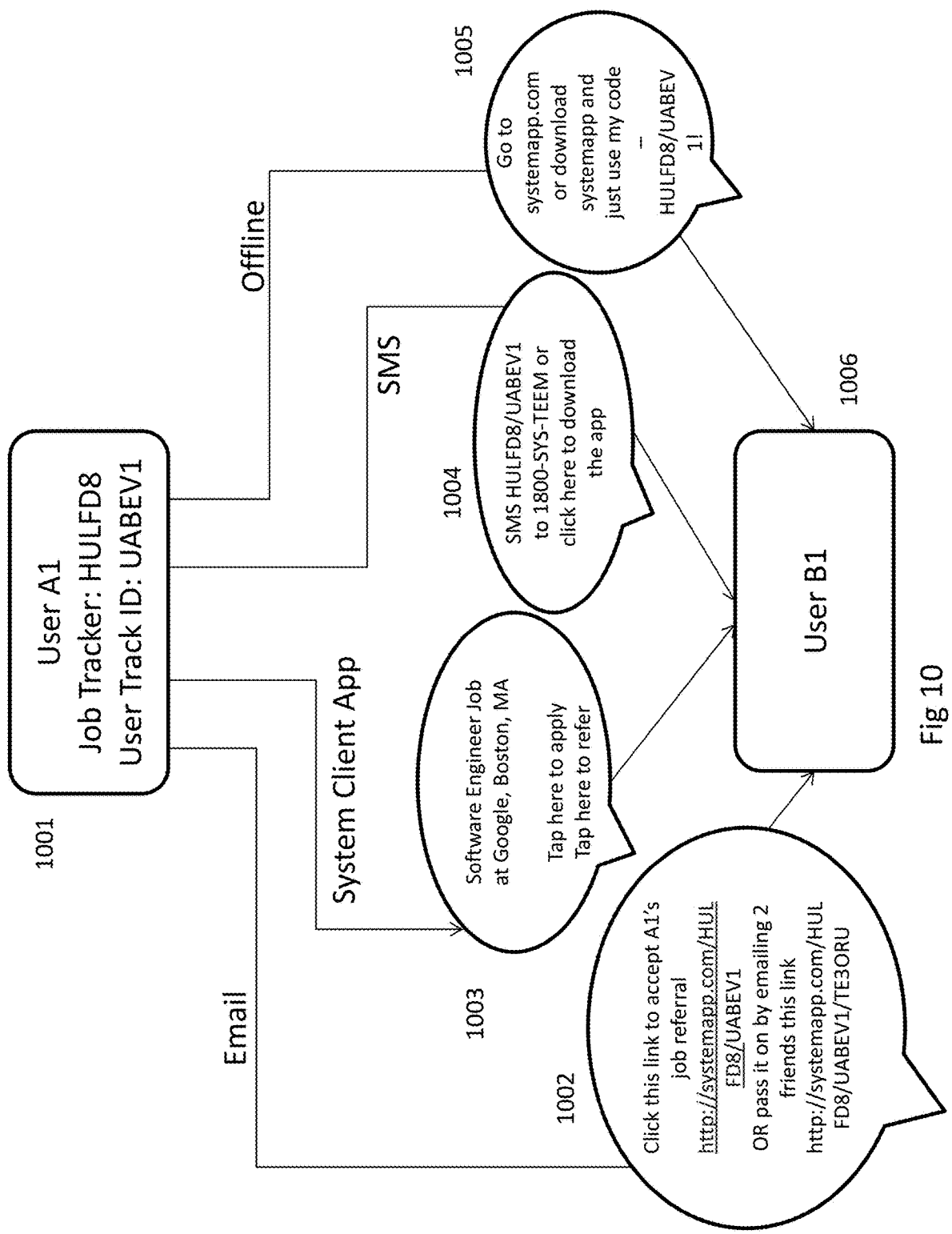
FIG. 10 illustrates the application to the present system of a commonly used tracking method for referral and affiliate tracking in online advertising, according to some embodiments of the present disclosure.

Processing and storage module 107 interfaces with the user facing module 108 that handles the identification of high quality referrers for different jobs, distribution of job openings to mass market users 109,110,111 of the user-facing service, and disbursing payments as shown in FIG. 3 to the users upon successful filling of a job position. FIG. 5 (below) describes some details of the user facing service that is enabled by user facing module 108. User facing module 108 includes a server based tracking database as described in FIG. 11 (below) which is used to facilitate the referral tracking in FIG. 9 (below), as well as algorithms to identify referrers as described in FIGS. 6, 7, 8 (below). A client side application also can be part of the user facing module 108. In some embodiments, the client side application enables users to interact with the system and with other users as shown in FIGS. 9, 10. The client side application can also include a third party payment interface using credit cards such as PayPal or Stripe, or an ACH based transaction solution like Square Cash or Balanced to facilitate automated payments from the system to users, or from users to each other. In some embodiments, payment and cash flow can be performed on the server side. In some embodiments, an interface can be used to redeem or earn points/rewards/money on the client side application. Payments and cash flow may be performed online, such as by PayPal or by rewards contained within the application-server modules, or offline, such as by ACH transfer or paper check.

Figure 2:
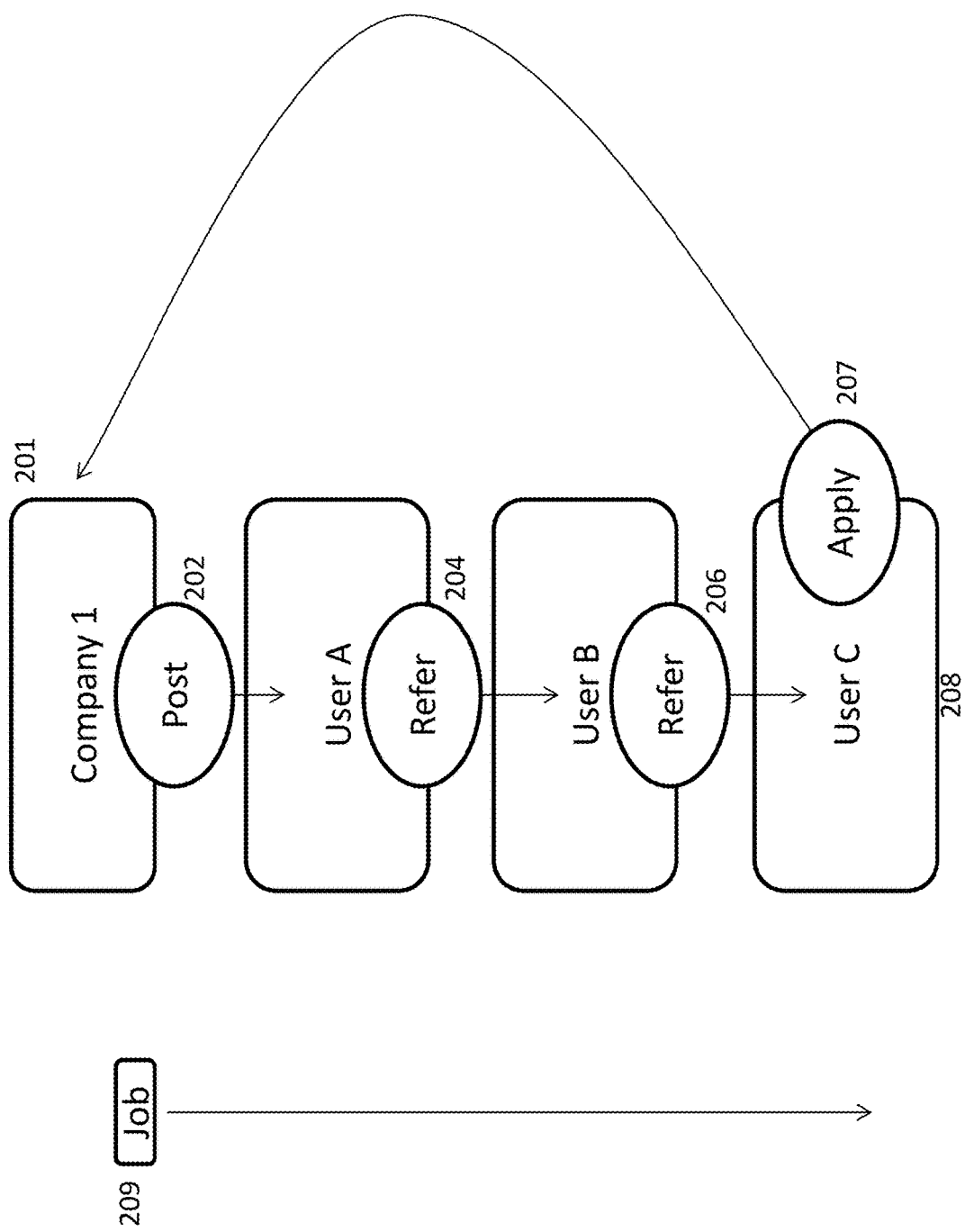
FIG. 2 is an illustration of a process used to fill a job opening for a particular company, according to some embodiments of the present disclosure.

FIG. 2 is an illustration of a process used to fill a job opening for a particular company, according to some embodiments of the present disclosure. Step 202 is the process of a company 201 posting a job 209 description, details and bounty to the system. Step 204 is illustrative of a single user A 203 in the user-facing application network "referring" another user B 205 thus making them aware of the job 209 posting. Step 206 illustrates a decision taken by user B 205 in "referring" to user C 208. Step 207 illustrates user C's 208 decision to apply for the relevant job 209 at the company 201 via the user facing application or via the company's inbound candidate source (e.g., email, SMS, online application form).

FIG. 3 is an illustration of the process used to disburse rewards in the form of cash or virtual currency to the users A 303, B 304, C 305 due to the success of user C's job application and being hired by the company 302, according to an embodiment of the present disclosure. The system computes the reward amounts based on one or more factors, including, the users' historical performance and referral quality, user loyalty to the system, and position in the chain of referrals that led to the filling of the job. This particular example shows users closer to the successful applicant (user C) receiving higher rewards for the result (where the number of [$] dollars corresponds to the relative amount of the reward). The earlier example with Janet, Jane, and John, was only based on a single factor—their position in the chain. The following example adds another factor—historical performance. John has been a very loyal user of our system, and has historical performance of a dozen successful referrals resulting in hires. On the other hand, this is the first time that Jane is making a referral and she has no historical performance. In this case, John should be compensated for not only his position in the chain, but also for his knack of making good referrals because it increases confidence in the quality of the referral. On the other hand, Jane has a better position in the chain since she is a first-degree connection to Janet, the applicant, but she shouldn't be compensated for confidence in quality like John. So instead of $7,000 for Jane and $3,000 for John, the system can compute $5,000 for each since they are both providing unique value.

Figure 4:
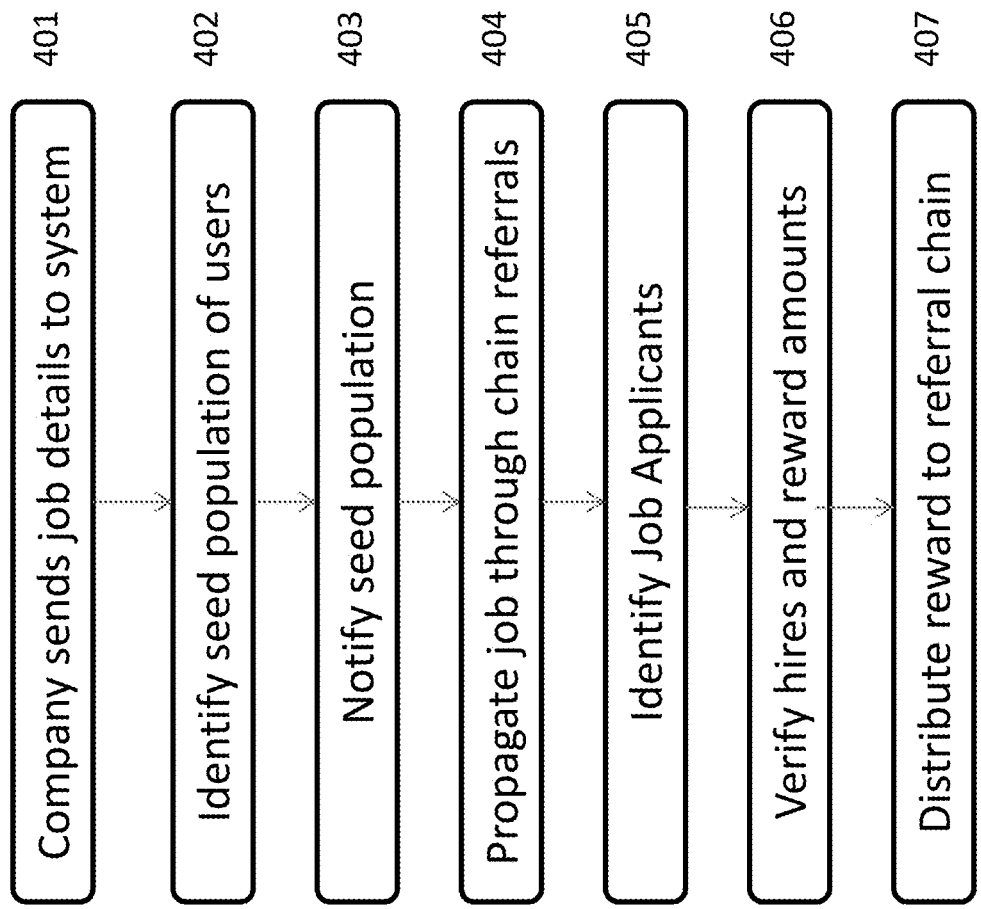
FIG. 4 depicts a summary of the process used to fill a job opening for a particular company, according to some embodiments of the present disclosure.

FIG. 4 shows a summary of the process described above, according to some embodiments of the present disclosure. The steps in this process include:

The company looking to fill a job notifies the system about a new Job opening. It provides some details about location, salary, desired qualifications, and reward.

The system uses the algorithms described in FIGS. 6 through 8 (below) to identify the seed population of users to notify about this new Job.

The system notifies the users of this job through a method like email, SMS, push notifications, or in some cases, only when users visit the consumer facing website or application.

The propagation of the job is done through a combination of user action and the process in 403.

Job applicants are identified whenever a user sends an applicant to the system, or a user of the system identifies themselves as an applicant through the consumer facing website or application. The system enters some or all of these applicants into the company's hiring process.

If the company hires any applicants identified by the system, the system can obtain verification from either the company or the applicant that was hired. The system computes the reward amounts for any users in the chain of referrals, including the applicant themselves, based on the process described with reference to FIG. 3.

The system then facilitates the distribution of these rewards computed in 406 to the end users using some payment solution—cash, check, PayPal, ACH bank transfer, etc.

FIG. 5 is an overview of the user-facing client application 505, according to embodiments of the present disclosure. Job information 503 is provided to the system client application 505. A networked system server 502 sends to the user facing client application 505, when there is a new opening or if another user in the system has referred user 509 for the job 503. The system client application can collect different types of information 510, 511, 512 with the user's permission for example, information from online social networks 510, online professional networks 511, address book/phone contacts 512, and offline contacts 513. In some embodiments, information may also include particular skills the contact possesses or jobs the individual is seeking. In some embodiments, the user may also mark a contact as someone they have high confidence in for future job openings. The relevant user data 504 is sent to the system server 502 for storage. The relevant user data 504 can include data from sources 510, 511, 512, information entered directly by the user 509 in the client app 505 such as a user name, or user behavior information collected passively by the client app 505. This information may be entered by the user whether or not a job app is pending.

The client app 505 can show the user via some user interface the Job 507 which is the same information as contained Job 503, but presented in a user-friendly format.

Figure 8:
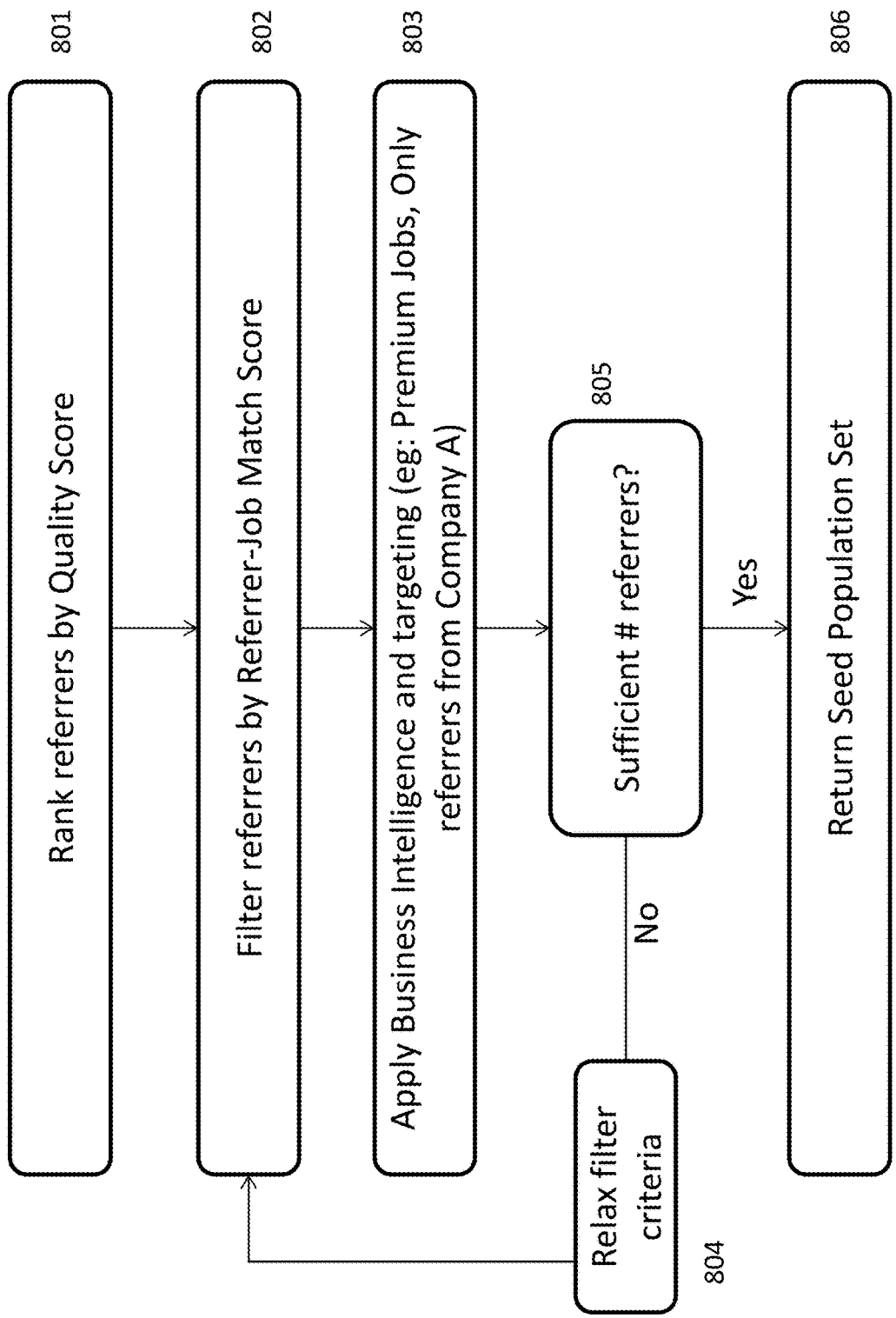
FIG. 8 illustrates using the scores in combination with the system's business intelligence for the particular customer to identify the seed population of referrers for a particular job opening, according to embodiments of the present disclosure.

The user-facing client app 505 can use data collected from the above-mentioned sources in combination with algorithms described in FIGS. 6 through 8 to suggest potential candidates 508 to the user 509.

The user 509 communicates a referral 506 back to the client app 505 through some user action where the user 509 either applies to the job themselves or refers another user candidate. The information in referral 506 along with some tracking information collected by the client app 505 is collected as a trackable referral 501 and communicated back to the system server 502.

FIGS. 6 through 8 describe the different parts of identifying the seed population for a job opening. The seed population can be a group of app users determined by the system to be a good starting network of referrers to either apply to the job themselves, to refer other candidates for the job, or to refer other referrers for the job.

FIG. 6 illustrates one way to compute a metric called a Match Score that serves as an indicator of how well a particular job opening relates to a particular user in the application network. For example, as shown in FIG. 6 Job information, e.g., location, title, position, requirements, company profile, historical referral data 601 can be combined with user data, e.g., location, work history, current job, industry, social and professional networks, job referral history and success rate 602 to arrive at a referrer match score for a job 603. A higher Match Score reflects a higher likelihood of the user being able to refer successful candidates or referrers for the job. The Match Score is computed using a method such as calculating the weighted vector distance between a job and a user based on dimensions like location, title, industry, company, past hires, etc., where the weights are updated using standard Machine Learning techniques for score efficiency improvement. Here is an illustration of one such technique. Let us define a Feature Vector V with three dimensions—company, location, and title. Further, let us define a distance function D that computes the distance between two such vectors V1 and V2 based on the number of dimensions that are equal. So If V1=[Google, Boston, Engineer] and V2=[Apple, Boston, Engineer], then D(V1, V2)=1,
If V2=[Apple, Boston, Engineer] and V3=[Apple, Cupertino, Engineer], then D(V2, V3)=1,
since in both these cases two vectors differ only in a single dimension; however,
If V1=[Google, Boston, Engineer] and V3=[Apple, Cupertino, Engineer], then D(V1, V3)=2,
since both company and location are different for V1 and V3. Now let us define the Match Score function M, as M(a, b)=1/(1+D(a,b)). It is easy to see that a lower distance will mean a higher match score.

A Job Feature Vector is defined as VJ a Feature Vector that is populated with the company, location, and title of the job. Let us define a User Feature Vector VU as a Feature Vector that is populated with the user's current company of employment, the user's current location, and the user's current title within that company. The Match Score for a User U with a Job J would now be M(VJ, VU).

If slightly more importance is given to the location dimension while computing the match score, the distance function D could be modified to double the differences in location when calculating distance, effectively giving weight 2 to the location dimension. Accordingly, the new Weighted Distance Function W can behave like this:

If V1=[Google, Boston, Engineer] and V3=[Apple, Boston, Engineer], then W(V1, V2)=1
If V2=[Apple, Boston, Engineer] and V3=[Apple, Cupertino, Engineer], then W(V2, V3)=2, (because the location counts for double!)
If V1=[Google, Boston, Engineer] and V3=[Apple, Cupertino, Engineer], then W(V1, V3)=3, because it's 1 for the company difference, plus 2 for the location difference Now, defining a new Match Score M (a, b)=1/(1+W(a,b)) can enable the Match Score to take advantage of this unequal importance of dimensions.

Using a well-known technique like supervised or semi-supervised learning with Support Vector Machines (SVMs) or clustering based SVMs for unsupervised learning, the system can improve the Match Score even further using third-party data collected about existing referral based hiring in the industry, or learning from the initial users of the system and the success conditions of their referrals. The system can also use these techniques to establish correlations between all the different dimensions, and reduce the set of dimensions to the ones that really matter for success (called dimension reduction techniques in machine learning).

FIG. 7 illustrates one way to compute a metric called the Quality Score that serves as an indicator of how valuable a particular user in the app network is, in terms of their ability to produce high quality leads either directly or indirectly. Referrer quality score 704 can be calculated by adding the following, which are results of prior job referrals: Seeded Job 1+Outcome (number of people referred successfully, number of people referred unsuccessfully, did not refer, referral depth per person referred, referral time-to-hire) 701; Seeded Job 2+Outcome (number of people referred successfully, number of people referred unsuccessfully, did not refer, referral depth per person referred, referral time-to-hire) 702 through Seeded Job N+Outcome (number of people referred successfully, number of people referred unsuccessfully, did not refer, referral depth per person referred, referral time-to-hire) 703. For example, the Quality score 704 can be computed based on the historical referral performance of the user in terms of successful hires, failed referrals, and time-to-hire, along with a measure of their influence within their social or professional network. This measure of influence is based on commonly accepted measures such as number of friends in a social network, number of professional contacts within an industry, Klout score, etc. Similar machine learning techniques can be used as described above to figure out which of the dimensions (historical performance, time-to-hire, etc.) matter the most, and improve the Quality Score computation over time, or even using third-party data collected during market research for referral based hiring.

FIG. 8 can use the scores computed in FIGS. 6 802 and 7 801 in combination with the system's business intelligence for the particular customer to identify the seed population of referrers for a particular job opening. For example, in some embodiments, the method can include the following steps: rank referrers by Quality Score 801; filter referees by Referee-Job Match Score 802; Apply Business Intelligence and targeting 803, etc. While FIG. 8 displays a particular order for the steps, the order of the steps may not be fixed and can occur in any order.

An example of business intelligence might be a case where a company wishes to receive a certain number of applicants in a certain amount of time. Given these constraints, the system can relax or tighten the seed population criteria 804 to produce network effects that will meet the wishes of the company. In effect, the system can "throttle" the flow of inbound applicants to the company by using different ranges or Quality and Match Scores, along with how many referrals are allowed per user per job (refer to FIG. 9). Here is an illustration of how these steps work under the following assumptions:

The company A wishes to get 8-10 candidate applications for a particular job opening from the system, within 2 days. They have specified in their request that they would prefer referrals from people within company A.

Each user is allowed to refer at most 2 other users. For simplicity, let's assume that every user that is able to, does indeed make the maximum number of allowed referrals.

Every time a user A refers another B, it takes 1 day for B to have the time to check out the referral and take some action.

There are 100 currently active users in the system, and they each have a unique quality score 1-100. User A is from the company A, has a quality score of 100 and a match score of 1. User B and C are also from the company A have a quality score of 90, 89 respectively and both have a match score of 0.5. User D has a quality score of 95, match score of 0.4, but is not from company A. All other users have a match score of 0.2 with respect to the particular job at hand.

Given these parameters of operation, if the system wants to provide the best 8-10 candidates for the company within 2 days, that means that there can be at most 2 hops in the chain until each of the candidates is found. The algorithm can be applied as follows:

- 801—Rank by Quality Score. Referrers are ranked A, some 4 people, D, B, C, everyone else.
- 802—Filter by Match Score. We start with a high standard, and only choose match scores above 0.5. In this case, only A remains.
- 803—Since user A is working for company A, they pass the Business Intelligence criteria.
- 805—If the seed population is just one person, then we can get at most four candidate applications in two days, since each user can make at most 2 referrals. (First day, user A refers two referrers, and those two people refer two candidates each on the second day at best, yielding four total candidates). This may not be sufficient for the company. Accordingly, the filter criteria can be relaxed 804. In fact, we know that we should relax the criteria to allow for a yield of at least eight candidate applications, and that this could be accomplished with two seed users.
- 804—The filter criteria can be relaxed to allow a match score of exactly 0.5 in addition to those above. In this case, the following steps 802, 803 will yield three users A, B and C in that order.
- 805—Since only two are needed, and C is the last ranked, C can be discarded.
- 806—Return user A and user B as the seed population.

If D had a match score of 0.5, D would have ranked above B and C in the quality score and also passed the match score filter, but would be discarded during the Business Intelligence filter.

Assuming that after a day of operation with the seed population of user A, B, the system observed that there have only been three referrals (as opposed to the maximum four). This would mean that in two days, the system would only be able to yield six candidates instead of the eight expected. The system could in this situation continue to relax the filter criteria to add another seed user, C, with the hope of increasing the yield to meet the company A's expectations.

FIG. 9 describes the tracking of referrals for the job as well as the enforcement of referral criteria such as the referral limit per user per job. When a job is first distributed to users, each user can receive a tracking pixel 902 from the system 901 which can be modified and passed along as means of referral e.g., 906, 907. For example, the tracking pixel 906 contains data that is unique to a particular job, user A 903 the referrer, and user B1 908 the referee. For this illustration there is a limit of two referrals per user per job. As a result, when user A1 903 tries to modify and send a unique tracking pixel to a third user B3 905, once unique tracking pixel 906 has been transmitted to user B1 908 and unique tracking pixel 907 has been transmitted to user B2 909, neither user A nor user B3 905 will receive credit if B3 905 applies to the position, and the user apps will either notify them of this issue or prevent user A1 903 from sending this pixel to B3 905 in the first place.

FIG. 10 describes an application to the present system of a commonly used tracking method for referral and affiliate tracking in online advertising. It works for a variety of different communication mediums both online and offline for example email 1002, a client mobile or web application 1003, SMS 1004, or by other offline communication 1005. Block 1001 describes the pieces of information required, in some embodiments, to ensure track-ability of referrals in a way that works in several mediums both inside and outside the system, both online and offline. In some embodiments, block 1001 can include a user (e.g., User A1), a job tracker ID (e.g., HULFD8), and a user track ID (e.g., UABEV1). The user ID is the source of referral, which is unique to the user who is taking the action of referring. The second is the job that is being referred. Since each user in the system has a unique tracking code, and each job has a unique tracking code, a simple concatenation of those two codes would be the most basic embodiment of this kind of tracking pixel. Other embodiments may have some extra pieces of information like timestamp, IP address, etc. which will help with post-mortem analysis, verifying authenticity of the referrer and the data, security checks, bot detection, etc. If user A1 refers a job to user B1 1006 by sending them an email with such a tracking pixel "HULFD8/UABEV1," then when user B1 sends this pixel back to the system by signing into the user-facing client application, going to the system website, etc. the system will know exactly which job is referred and by whom. If user A1 refers the job to user B1 1006 via the client app as shown in 1003, then the system can assign a "temporary" tracking code TE3ORU to user B1, even though they have not signed up for the service, since the system knows at least user B1's email address that was required to send the referral to them. This tracking code will become permanent once B1 signs up for the system service, but will enable B1 to refer some limited number of candidate applicants using this temporary tracking code in the meantime.

FIGS. 11, 12, 13 are exemplary database models used by the system to store information related to the chain of referrals, different job descriptions and companies, and different users of the app.

FIG. 11 depicts a Tracking Database Table, according to some embodiments of the present disclosure. In some embodiments, each row in the database table 1100 corresponds to the propagation of a job through one hop in the chain of referrals from company to candidate applicant. It has a Job ID 1101 that identifies the job, a company ID 1102 that identifies the company with the opening, the source of the referral as From ID 1103, the destination of the referral as To ID 1104, the Tracking ID 1105 that is the ID for the tracking pixel associated with this referral, the method of delivery 1106 such as email, and the status of that Job 1107 since the referral. This sort of database would let the system infer the exact chain of referrals post-hire in order to compute and disburse rewards. For example, by inspection of the database, one can see that the lifecycle of Job 110 was that it was passed from user 1 to user 2, then from user 2 to user 3, then from user 3 to user 4, and the Applied status indicates that user 4 actually applied for the Job 110 at company 5.

FIG. 12A shows job table 1200. In some embodiments, the job table 1200 contains the static information about the job being passed around, where the job is identified by its job ID 1201. For each new job opening there would be a new entry in this table, and the referral chain lifecycle of that job would be started and tracked in the Tracking Database Table from FIG. 11. In some embodiments, a single job might have information such as a Company ID 1202 belonging to the company with the job opening, the location of the job opening 1203, the expected salary for the position 1204, expected compensation benefits 1205 (including variables such as equity and bonus amounts), the category or title or type of job 1206, and the agreed-upon reward or value 1207 for filling the position.

FIG. 12B shows a company table 1210. In some embodiments, company table 1210 contains information about the customers of the system 1211 identified by their Company ID 1212 that translates across the system as an identifier, location of the company for customer-relation-management (CRM) purposes 1213, and contact information 1214 for the customer for fulfillment, billing, job applications, etc. This can be similar to an industry standard CRM (customer relationship management) database table solution.

FIG. 13 is the user information table 1300. In some embodiments, user information table 1300 contains user-dependent and generally job independent information. The user information can include user ID 1301, username 1302, token 1303, type 1304, tracking ID 1305, location 1306, source 1307, and quality score 1308. The information in this table should generally not change very much over time, except for the Quality Score 1308. The Token 1303, and Type 1304 information is related to user authentication using one of several popular login systems, the Tracking ID 1305 of a user is what they use to identify themselves inside and outside the system while referring jobs, and the Source 1307 is where the user first heard about and joined the system from. Each user will also have a unique user ID 1301 that is internal to the system, a username or contact name 1302, and demographic information such as location 1306.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computer-implemented method for organizing a job referral database comprising:
    organizing in a database, by a processor, company information, job information, candidate information, and tracking elements that contain information related to referral criteria;
    tracking, in the database, by the processor, a referrer quality of each candidate through a multi-dimensional analysis of each candidate's ability to serve as a referrer, the multi-dimensional analysis including, for each respective candidate, scoring the respective candidate according to a number of prior job referrals and respective outcomes of each of the prior job referrals;
    calculating, by the processor, based on a distance function of at least two dimensions from the database, candidate match scores;
    enforcing, by the processor via the database, referral criteria based on the tracking elements, receiving job description data associated with a job opening;
    identifying, by the processor from within the database, a seed population of candidates from a plurality of candidates based on the job information, candidate match scores, and referrer quality data;
    notifying, by the processor, the seed population of candidates of the job opening via a plurality of trackable electronic notification messages, wherein each of the plurality of trackable electronic notification messages identify specific candidates in the seed population of candidates and wherein each of the plurality of trackable electronic notification messages includes a tracking element incorporating a unique identifier associated with the job opening and the specific candidate, the notifying including, for each candidate from the seed population of candidates, generating a tracking pixel as the tracking element, the generating including:
        forming a concatenation of an identifier of the candidate, at least a portion of the company information, and at least a portion of the job information from the database; and
        assigning a referral limit to the tracking pixel, the referral limit specifying a number of modifications to the tracking pixel after which the tracking pixel is no longer eligible for modification;
    forming within the database a chain of referrals, by the processor, wherein the forming includes:
        tracking forwarding of the plurality of trackable electronic notification messages from one candidate to another candidate based on the tracking element, the tracking including, for each instance of forwarding, modifying the tracking pixel to include data unique to the another candidate;
        identifying referral hops based on results of the tracking of the plurality of trackable electronic notification messages, the identifying including omitting instances of forwarding that modified the tracking pixel after the tracking pixel was no longer eligible for modification; and
        inferring the chain of referrals based on the identified referral hops, wherein the chain of referrals corresponds to the propagation of information regarding the job opening between candidates;
    receiving, by the processor, a job application from an end candidate in the chain of referrals wherein the job application includes a particular trackable electronic notification message of the plurality of trackable electronic notification messages;
    receiving, by the processor, a notification that the end candidate has been hired; and
    causing, by the processor, rewarding of the candidates in the chain of referrals corresponding to the hired end candidate and the particular trackable electronic notification message.

2. The method of claim 1, wherein the job description data comprises a bounty value for the job opening and one or more of job opening position, job opening location, job opening salary, job opening benefits, and company background.

3. The method of claim 1, wherein the referrer quality data estimates the ability of a potential candidate in the plurality of potential candidates to serve as a successful referrer for the job opening by combining two or more dimensions to compute a score.

4. The method of claim 1, wherein the trackable electronic notification message is forwarded to at least one additional candidate not within the plurality of candidates.

5. The method of claim 4, further comprising receiving an application to join the plurality of candidates from the at least one additional candidate.

6. The method of claim 1, wherein the identified referral hops exclude information resulting from forwarding of the message to more than a predetermined number of new additional candidates.

7. The method of claim 1, wherein the identified referral hops exclude information resulting from forwarding of the message to one or more new additional candidates when the forwarding occurs more frequently than a predetermined number of times within a predetermined amount of time.

8. The method of claim 1, wherein the identified referral hops exclude information resulting from forwarding of the message to one or more new additional candidates when the forwarding occurs at a more frequent interval than a predetermined minimum interval.

9. The method of claim 1, wherein the candidates in the chain of referrals are rewarded by splitting a bounty value for the job opening.

10. The method of claim 9, wherein the distribution of the bounty value to each candidate in the chain of referrals is determined by one or more of candidate position in the chain of referrals, historical referrer performance of the candidate, and payment of a separate bonus directly to at least one of the candidates in the chain of referrals.

11. The method of claim 1, wherein criteria used to identify the seed population is modified in order to identify a different amount of candidates in the seed population, wherein the amount of candidates in the seed population is changed in order to modify a number of job applications received for the job opening.

12. The method of claim 1, further comprising collecting information from one or more candidates of the plurality of candidates, wherein the information is used to create the referrer quality data and wherein the information comprises one or more of online social network information, online social network contacts, online professional network information, online professional network contacts, address book contacts, phone book contacts, offline contacts, contact skillsets, and jobs desired by contacts.

13. An apparatus comprising:
one or more hardware processors; and
a non-transitory computer-readable storage medium coupled to the processor, wherein the non-transitory computer readable storage medium comprises instructions operable to cause the one or more hardware processors to:
organize in a database, company information, job information, candidate information, and tracking elements that contain information related to referral criteria;
track, in the database, a referrer quality of each candidate through a multi-dimensional analysis of each candidate's ability to serve as a referrer, the multi-dimensional analysis including, for each respective candidate, scoring the respective candidate according to a number of prior job referrals and respective outcomes of each of the prior job referrals;
calculate, based on a distance function of at least two dimensions from the database, candidate match scores;
enforce, via the database, referral criteria based on the tracking elements, receive job description data associated with a job opening;
identify a seed population of candidates from a plurality of candidates based on the job information, candidate match scores, and referrer quality data;
notify the seed population of candidates of the job opening via a plurality of trackable electronic notification messages, wherein each of the plurality of trackable electronic notification messages identifies specific candidates in the seed population of candidates and wherein each of the plurality of trackable electronic notification messages includes a tracking element incorporating a unique identifier associated with the job opening and the specific candidate, the notifying including, for each candidate from the seed population of candidates, generating a tracking pixel as the tracking element, the generating including:
forming a concatenation of an identifier of the candidate, at least a portion of the company information, and at least a portion of the job information from the database; and
assigning a referral limit to the tracking pixel, the referral limit specifying a number of modifications to the tracking pixel after which the tracking pixel is no longer eligible for modification;
form a chain of referrals, wherein the chain of referrals is formed by:
tracking forwarding of the plurality of trackable electronic notification messages from one candidate to another candidate based on the tracking element, the tracking including, for each instance of forwarding, modifying the tracking pixel to include data unique to the another candidate;
identifying referral hops based on results of the tracking of the plurality of trackable electronic notification messages, the identifying including omitting instances of forwarding that modified the tracking pixel after the tracking pixel was no longer eligible for modification; and
inferring the chain of referrals based on the identified referral hops, wherein the chain of referrals corresponds to the propagation of information regarding the job opening between candidates;
receive a job application from an end candidate in the chain of referrals wherein the job application includes a particular trackable electronic notification message of the plurality of trackable electronic notification messages;
receive a notification that the end candidate has been hired; and
cause the candidates in the chain of referrals corresponding to the hired end candidate and the particular trackable notification message to be rewarded.

14. The apparatus of claim 13, wherein the referrer quality data estimates the ability of a potential candidate in the plurality of potential candidates to serve as a successful referrer for the job opening by combining two or more dimensions to compute a score.

15. The apparatus of claim 13, wherein the identified referral hops exclude information resulting from forwarding of the message when the message is forwarded to an amount of new additional candidates exceeding a predetermined threshold number of additional candidates,
forwarded to new additional candidates more frequently than a predetermined threshold number of times within a predetermined amount of time, or
forwarded to new additional candidates at a more frequent interval than a predetermined time interval.

16. The apparatus of claim 13, wherein the additional candidates are not within the plurality of candidates.

17. The apparatus of claim 13, wherein the trackable electronic notification message is configured to be forwarded to at least one additional candidate not within the plurality of candidates.

18. The apparatus of claim 13, wherein the trackable electronic notification message comprises one or more of an e-mail, an SMS message, a push notification to a computing device, or a notification via a consumer-facing website.

19. The method of claim 1, wherein the tracking of the referrer quality of each candidate comprises determining, by the processor, a respective quality score for each candidate based at least in part on a hiring process of the end candidate.

20. The apparatus of claim 13, wherein the tracking of the referrer quality of each candidate comprises determining a respective quality score for each candidate based at least in part on a hiring process of the end candidate.

\* \* \* \* \*